US012397315B2

(12) United States Patent
Jongen et al.

(10) Patent No.: US 12,397,315 B2
(45) Date of Patent: Aug. 26, 2025

(54) INSTALLATION FOR TREATING MASS-PRODUCED PARTS, WITH SECONDARY DRIVE DEVICE

(71) Applicant: WMV Apparatebau GmbH, Windeck (DE)

(72) Inventors: Hubert Jongen, Windeck (DE); Martin Müller, Hennef (DE); Gregor Beckmann, Windeck (DE)

(73) Assignee: WMV Apparatebau GmbH, Windeck (DE)

( * ) Notice: Subject to any disclaimer, the term of this patent is extended or adjusted under 35 U.S.C. 154(b) by 468 days.

(21) Appl. No.: 18/019,718

(22) PCT Filed: Jun. 30, 2021

(86) PCT No.: PCT/EP2021/068010
§ 371 (c)(1),
(2) Date: Feb. 3, 2023

(87) PCT Pub. No.: WO2022/028782
PCT Pub. Date: Feb. 10, 2022

(65) Prior Publication Data

US 2023/0286011 A1 Sep. 14, 2023

(30) Foreign Application Priority Data

Aug. 6, 2020 (EP) .................................... 20189930

(51) Int. Cl.
*B05C 3/08* (2006.01)
*B04B 5/02* (2006.01)
(Continued)

(52) U.S. Cl.
CPC .................. *B05C 3/08* (2013.01); *B04B 5/02* (2013.01); *B05B 13/0257* (2013.01); *B05C 3/10* (2013.01); *B05C 11/08* (2013.01)

(58) Field of Classification Search
CPC .... B05C 3/08; B05C 3/10; B04B 5/02; B05B 13/0257
See application file for complete search history.

(56) References Cited

U.S. PATENT DOCUMENTS

2019/0060945 A1 2/2019 Forster et al.

FOREIGN PATENT DOCUMENTS

EP 3696121 A1 8/2020
ES 2204214 A1 4/2004
(Continued)

OTHER PUBLICATIONS

International Search Report issued in corresponding International Application PCT/2021/068010, mailed Sep. 17, 2021.

*Primary Examiner* — Nathan T Leong
(74) *Attorney, Agent, or Firm* — Burris Law, PLLC

(57) ABSTRACT

An installation for treating mass-produced parts includes: a supporting structure with a supporting element, a basket carrier for at least two centrifuge baskets, a main drive device attached to the supporting structure and having a main drive and a longitudinal shaft, the longitudinal shaft being mounted rotatably about a main axis relative to the supporting element and being drivable rotatably about the main axis by the main drive, wherein the basket carrier is held suspended at the longitudinal shaft and is connected to the longitudinal shaft in a rotationally fixed manner, and a secondary drive device having at least one motor and, for each centrifuge basket, a drivetrain for rotating the centrifuge basket about a basket axis radially spaced from the main axis, wherein the at least one motor of the secondary drive device is arranged on the basket carrier.

15 Claims, 8 Drawing Sheets

(51) Int. Cl.

| | |
|---|---|
| ***B05B 13/02*** | (2006.01) |
| ***B05C 3/10*** | (2006.01) |
| ***B05C 11/08*** | (2006.01) |

(56) References Cited

FOREIGN PATENT DOCUMENTS

| | | | | |
|---|---|---|---|---|
| JP | H03267162 | A | | 11/1991 |
| KR | 20160025770 | A | | 3/2016 |
| KR | 20160069654 | A | | 6/2016 |
| KR | 20160069654 | | * | 9/2017 |

* cited by examiner

INSTALLATION FOR TREATING MASS-PRODUCED PARTS, WITH SECONDARY DRIVE DEVICE

CROSS-REFERENCE TO RELATED APPLICATIONS

This application is a National Phase of International Application No. PCT/EP2021/068010, filed on Jun. 30, 2021, which claims priority to and the benefit of EP 20189930.9 filed on Aug. 6, 2020. The disclosures of the above applications are incorporated herein by reference.

FIELD

The present disclosure relates to an installation for treating mass-produced parts.

BACKGROUND

The statements in this section merely provide background information related to the present disclosure and may not constitute prior art.

From ES 2 204 214 A1, in installation is known for treating mass parts held in centrifuge baskets, which can be transferred successively to three stations by a rotary arm suspended from a frame. For this, a basket assembly of three of the centrifuge baskets is arranged at each of the two longitudinal ends of the rotary arm, with each basket assembly being rotatably supported at the respective longitudinal end of the rotary arm by a basket shaft. The three stations are arranged around an axis of rotation of the rotating arm so that the basket assemblies can be transferred from one station to the next by rotating the rotating arm step by step. In the filling station, the centrifuge baskets of a respective basket assembly are filled with mass parts one after the other. For this, a rotary motor arranged on the end of the basket shaft rotates the respective basket assemblies step by step about the basket axis to fill the mass parts into the three centrifuge baskets one after the other via a chute. The treatment station then follows, wherein the basket assembly is raised by a lifting device to immerse it into a dip tank. In the treatment station, the centrifuge baskets of a respective basket arrangement are rotated around the basket axis by a separate centrifuge motor to centrifuge excess treatment liquid from the mass parts after lowering the dip tank. Finally, the unloading station follows, in which the centrifuge baskets of the respective basket arrangement are unloaded one after the other via a conveyor belt. For this, the rotation motor rotates the respective basket arrangement step by step about the respective basket axis, so that the centrifuge baskets can be aligned and unloaded one after the other above the conveyor belt. It is considered disadvantageous that the system is complex and costly to manufacture and maintain due to the large number of motors and that the excess treatment liquid can only be spun off moderately by rotating the basket arrangements around the basket axes.

Another installation for treating mass-produced parts is known from EP 3 441 149 A1. The installation comprises a basket carrier to which two centrifuge baskets are reversibly detachably connected. The basket carrier is suspended from a longitudinal shaft, the longitudinal shaft being rotatably mounted about a main axis relative to a central beam of the frame. The longitudinal shaft is drivingly connected to a main motor attached to the center beam, so that the basket carrier, which is non-rotatably connected to the longitudinal shaft, can be rotatably driven about the main axis by the main motor. To be able to additionally rotate the centrifuge baskets about their basket axes radially spaced from the main axis, drive wheels driven by toothed belts are to be arranged at the ends of the basket axles facing the center beam. The toothed belts are to be driven by a toothed wheel rotatably mounted on the longitudinal shaft, wherein the toothed wheel arranged on the longitudinal shaft is in turn to be driven via a further toothed belt by a pinion of a secondary motor arranged on the center beam of the frame. Due to the high centrifugal forces that occur during the operation of the system, it has proven to be useful to attach not only the main motor but also the auxiliary motor for rotating the centrifuge baskets to the stationary frame. However, it is considered disadvantageous that a power transmission from the auxiliary motor to the belt drives arranged on the basket carrier is structurally complex and appears to be maintenance intensive.

From KR 10-2016-0069654 A, another installation for treating mass-produced parts is known in which the motors of the secondary drive device are arranged on the basket carrier. The basket carrier is rotatably suspended about an axis of rotation on a frame on which a main motor is arranged for rotationally driving the basket carrier. The motors of a secondary drive device are arranged at radially outer end faces of the basket carrier, wherein a power transmission unit is provided between the motors and rotary shafts in each case. A further system for treating mass-produced parts is known from KR 10-2016-0025770 A.

SUMMARY

This section provides a general summary of the disclosure and is not a comprehensive disclosure of its full scope or all of its features.

In one form, the present disclosure relates to an installation for treating mass-produced parts, the installation comprising: a supporting structure with a supporting element, a basket carrier for at least two centrifuge baskets, a main drive device attached to the supporting structure with a main drive and a longitudinal shaft, wherein the longitudinal shaft is mounted rotatably about a main axis relative to the supporting element and is rotatably drivable about the main axis by the main drive, the basket carrier being held suspended on the longitudinal shaft and having a base member connected to the longitudinal shaft in a rotationally fixed manner, and a secondary drive device having at least one motor and, for each centrifuge basket, a drivetrain for rotating the centrifuge basket about a basket axis radially spaced from the main axis.

Such installations can be used for treating, for example for coating of, in particular pourable bulk parts, such as screws, stamped parts or the like. After the mass parts have been poured into the centrifuge baskets, these are immersed in an immersion bath with a liquid coating agent to wet the mass parts and can be rotated about their basket axes as required. The centrifuge baskets are then spun outside the coating medium to spin off excess coating medium from the mass parts.

It is an object of the teachings of the present disclosure to improve the installation over the state of the art.

The object is solved by an installation of the type mentioned above, in which the secondary drive device is arranged on the basket carrier. Advantageous configurations are described in the subclaims.

In one form, it is advantageous that the at least one motor is arranged directly on the basket carrier. This eliminates the need for mechanically complex and failure-prone connections to rotatably drive the centrifuge baskets about the basket axes with a drive arranged on the support structure. Instead, the at least one motor always rotates together with the basket carrier about the main axis when the main drive device rotationally drives the basket carrier. This provides an installation whose secondary drive device is more compact and better able to withstand centrifugal forces. The main drive unit and the secondary drive unit are mechanically separated from each other so that both drive units can operate independently of each other.

In one form, the secondary drive device is arranged on the basket carrier. Thus, the secondary drive device always jointly rotates with the basket carrier around the main axis, when the basket carrier is rotationally driven by the main drive. In this way, the secondary drive device located on the basket carrier is distanced from the supporting structure, which makes the installation as a whole easier to manufacture and easier to maintain.

In one form, the basket carrier is connected only to the longitudinal shaft, respectively attached to same. In other words, the basket carrier is attached to the longitudinal shaft in a freely suspended manner. The basket carrier can be aligned horizontally and can also be referred to as a rotor.

The longitudinal shaft can be hollow-cylindrical or a hollow shaft through which supply lines for connecting the secondary drive device to a supply system of the installation are passed from the support structure to the basket carrier. The at least one motor can be an electric motor, in particular a servomotor. The supply system may comprise an electrical power supply of the installation, to which the at least one motor may be connected. However, it is also generally possible that the at least one motor is a pneumatic motor. Accordingly, the supply system may comprise a pneumatic ring line of the installation to operate the at least one motor with compressed air. The supply lines may thus comprise electrical lines and/or pneumatic lines. In this way, the secondary drive device and optionally other components arranged on the basket carrier can be connected to an electrical power supply and/or a pneumatic supply system of the installation. The electrical power supply to the secondary drive device can also be provided by a power storage unit for electrical energy, which can also be attached to the basket carrier. This allows the secondary drive device to be self-sufficient from a central power supply of the installation, to which the main drive device may be connected. Thus, especially with the self-sufficient option described above, the longitudinal shaft can in principle also be a solid shaft.

Furthermore, a control line and/or a bus line can be routed through the hollow longitudinal shaft. In this way, sensors, actuators and the like arranged on the basket carrier for the secondary drive device and for optionally further components arranged on the basket carrier can be integrated, for example, into a bus system of the installation. In this way, for example, the rotational position of the basket carrier or the centrifuge baskets, rotational directions and rotational speeds, the state of the connection assemblies, and/or whether the centrifuge baskets are coupled or uncoupled, etc. can be individually queried and controlled.

At an end of the longitudinal shaft facing away from the basket carrier, a central rotary lead-through can be arranged for the supply lines, in particular the electrical lines and/or pneumatic lines and optionally provided control lines, wherein the central rotary lead-through can have a first body supported with respect to the supporting structure and a second body connected to the longitudinal shaft in a rotationally fixed manner. The rotary lead-through allows the lines to pass between the stationary first body and the rotating second body. The lines coming from the support structure can thus be reliably guided through the central into the end of the longitudinal shaft facing away from the basket carrier, through the longitudinal shaft, out again at an end of the longitudinal shaft facing the basket carrier and finally to the basket carrier.

The basket carrier can comprise a main body. A shaft-hub connection, for example with a key and lock nut, can be used to attach the main body to the longitudinal shaft. For this, the main body can have a central receptacle into which an end of the longitudinal shaft facing the basket carrier can be inserted. Alternatives to a key connection are generally possible, wherein the connection in one form holds the main body firmly on the longitudinal shaft not only rotationally but also translationally due to its suspended arrangement. For example, the main body could be pressed onto the longitudinal shaft.

A rotary platform can be arranged on the basket carrier, in particular on the main body of the basket carrier, for each centrifuge basket, wherein the rotary platforms are rotatably drivable about the basket axes by the secondary drive device. Thus, the rotary platforms respectively can be drivingly connected to one of the drivetrains. The at least one motor is drivingly connected to the respective drivetrain. The rotary platforms may be of flange-like design or comprise flanges. The rotary platforms can be arranged at and/or below an underside of the main body facing away from the support element.

For reversibly releasably connecting the centrifuge baskets to the basket carrier, connection assemblies can be provided, which include components on the rotary platforms and further components on the centrifuge baskets. In particular, first connectors of the connecting assemblies may be arranged on the rotary platforms and second connectors of the connecting assemblies connectable to the first connectors may be arranged on the centrifuge baskets. In one form, the second connectors are passive connectors insertable into the active, first connectors. Passive connectors are understood to be rigid components that are held in the connected state by the active connectors. This allows the centrifuge baskets to be sandblasted, for example, without fear of damage to the second connectors. When the first connectors are arranged at the rotary platforms, it is also advantageous that the active connection partners of the connection assemblies can be connected to a supply network of the system via the basket carrier.

The main body of the basket carrier can have through holes concentric to the basket axes, through which pneumatic lines for actuating the first connectors are passed from the main body to the rotary platforms. The first connectors can be actuated with compressed air via the pneumatic lines. However, hydraulic or electric lines for actuating the first connectors would also be generally possible. In one form, in particular the pneumatic lines are routed together with the electric lines through the longitudinal shaft and the central rotary lead-through to the support structure in order to be able to connect the first connectors to a central compressed air supply of the installation. The electrical lines and/or the control lines can be routed up to the first connectors to be able to supply them with electrical power and/or connect them to the control unit as required. A secondary rotary feed-through for the lines for actuating the first connectors can be arranged on the basket carrier for each rotary platform, wherein the secondary rotary feed-throughs each have a first secondary body supported relative to the main body and a second secondary body connected to the rotary platform in a rotationally fixed manner.

The first connectors can be pneumatic clamping modules or center clamps in which the second connectors, which are designed as connecting bolts, can be clamped. The first connectors can each have a base member with a bolt receptacle into which the connecting bolt can be inserted. When the connecting bolt is inserted, it can be clamped to the base member by a locking mechanism. In this connected state, the connecting units support the centrifugal forces generated by the rotating centrifuge baskets during operation of the installation. Thus, in the connected state, the torque applied by the drive devices during operation of the installation can be safely transmitted to the centrifuge baskets via the connector assemblies. It is advantageous that only an axial movement of the centrifuge baskets relative to the basket carrier is necessary to insert the connecting bolts into the clamping modules.

The locking mechanisms can each have form-locking elements that are displaceably arranged on the base member of the first connectors. The form-locking elements can each be displaceable parallel to a plane which is aligned transversely, in particular perpendicularly, to the main axis. In one form, the form-locking elements are displaceable transversely, in particular radially to a central axis of the respective base member. For fixing the connecting bolts inserted into the bolt receptacles, the form-locking elements can be displaced towards the center axis of the respective base member. It is advantageous that only the locking mechanisms, in particular the form-locking elements, have to be moved to lock the inserted connecting bolts in the clamping modules. There is no rotational movement of the centrifuge baskets and the basket carrier relative to each other, as is necessary, for example, with a bayonet lock. The form-locking elements can be locking bolts which are displaceably arranged on the base bodies. In one form, two of the form-locking elements, in particular the locking bolts, are displaceably arranged on each of the base bodies, diametrically opposite each other. The locking mechanisms may comprise springs which load the form-locking elements with a spring force in a locked position, i.e. towards the center axis of the respective base member. As a result, the connector units are pressureless clamped. The locking mechanisms can be released pneumatically or, in principle, also hydraulically. As an alternative to the locking bolt design, the form-locking elements can also be displaceable balls. As a result, the connector units create a secure connection that holds the centrifuge baskets securely on the basket carrier in the connected state even in the event of disruptions in the operating sequence of the installation, for example caused by a failure of the electrical power supply or by a failure of pneumatic or hydraulic systems.

In particular, the connecting bolts can each have a groove running around a bolt axis, in which the form-locking elements engage positively in the connected state. In this way, in the connected state, the connecting bolts are fixed axially and radially to the respective center axis in the bolt receptacles of the base bodies, at least largely without play. The bolt axes run parallel to the main axis, at least when the centrifuge baskets are connected to the basket carrier.

The secondary drive device can have several of the at least one motor for rotating the rotary platforms about the basket axes. In particular, the secondary drive device can have a separate motor for each drivetrain. In this way, the drivetrains can be driven independently of each other. In other words, the secondary drive device may comprise, per rotary platform, its own power train comprising a motor and a drivetrain to be able to rotatably drive the associated rotary platform about the basket axis. This allows the centrifuge baskets to be rotatably driven individually or together. Likewise, the centrifuge baskets and/or the rotary platforms can be driven with respect to the direction of rotation in opposite or in the same direction, and with respect to the speed of rotation at the same or at different speeds. Since the secondary drive device operates independently of the main drive device, the rotational movements of the basket carrier about the main axis and the rotational movements of the rotary platforms and/or the centrifuge baskets about the basket axes are independent of each other. However, generally, the secondary drive device can also have only a single motor that drives the drivetrains centrally. The motors can be arranged symmetrically to the main axis on the basket carrier to avoid imbalances when the basket carrier rotates about the main axis.

The at least one motor may comprise a rotor shaft rotatably drivable about a rotor axis, wherein the rotor axis may be arranged on an imaginary first circle and the rotor axes may be arranged on an imaginary second circle. The first circle and the second circle may be arranged concentrically to the main axis, wherein a first radius of the first circle may be smaller than a second radius of the second circle. In this way, the centrifugal forces acting on the at least one motor during rotation of the basket carrier about the main axis, at which speeds of up to about 200 revolutions per minute are possible, can be reduced to a minimum required as installation space of the at least one motor. In particular, the first radius can be smaller than 0.5 times the second radius. Furthermore, the rotor axis may be arranged at a distance of less than 300 millimeters from the main axis. In particular, the distance of a rotation axis, about which the rotor shaft of the at least one motor rotates in a drivable manner, to the main axis can be less than 200 millimeters.

In particular, the drivetrains can each include a belt drive. In this way, the at least one motor can be distanced from the respective basket axis and advantageously positioned on the basket carrier in the direction towards the main axis. This increases the service life of the at least one motor, making the installation more robust and easier to maintain overall. The belt drives may comprise toothed belts, although other types of belts or a different traction drive are also generally possible. However, the toothed belt drives offer the advantage that, compared to other traction drives, narrower wrap angles are possible, so that the toothed belts ensure reliable torque transmission despite the high centrifugal forces that occur when the basket carrier rotates about the main axis. In particular, the belt drives each have a drive pulley firmly connected to the rotor shaft of the associated motor and a driven pulley. The driven pulley can be arranged concentrically to the basket axis of the respective drivetrain. Furthermore, the drivetrains may each comprise at least one tensioning device. The respective tensioning device may, for example, comprise a spring mechanism for tensioning the toothed belt with a tensioning roller. Likewise, a tensioning device can also be provided with which the tension of the toothed belt can be adjusted. In particular, the drivetrains may each have two of the tensioning devices, for example a spring-loaded tensioning roller and a fixedly adjustable tensioning roller, although other combinations are also possible.

In order to reduce the drive speed of the motor associated with the respective drivetrain and to increase the torque accordingly, the belt drive can translate the drive speed into slow speed. The transmission ratio (abbreviated to "i"), which is defined as the quotient of the speed of the transmission input (here: the drive pulley) and the speed of the transmission output (here: driven pulley), can lie in a range of i=1.5 to i=10 for a respective belt drive. The rotational axes of the drive pulleys and driven pulleys can be arranged parallel to the main axis. The installation space for the secondary drive device on the basket carrier, respectively on the main body of the basket carrier, is limited by the dimensions of the basket carrier. However, particularly good results were achieved with a transmission ratio of i=2 to i=6, so that the driven pulleys with a larger diameter remain within the dimensions specified by the basket carrier, in particular by the main body.

During operation of the installation, the centrifuge baskets are rotated around the basket axes at up to 15 revolutions per minute as required. In order to reduce the drive speed of the at least one motor, which for the application here can rotate at up to 3000 revolutions per minute, for example, to the required number of revolutions for the centrifuge baskets, the drivetrains can each have a reduction gear. The reduction gears can be located downstream of the belt drive in the power path of the respective drivetrain. The reduction gears can be attached to the basket carrier. By integrating the reduction gear into the respective drivetrain, the speed is reduced and the transmittable torque is significantly increased. As a result, the at least one motor of the secondary drive device can also have a relatively low nominal torque, so that the motor can have a compact design and a low own weight. In one form, the at least one motor has a nominal torque in the range of 5 Newton meters to 20 Newton meters, and further in one form the nominal torque is at least approximately 10 Newton meters. The nominal torque describes the maximum permissible continuous torque that may act on the rotor shaft of the motor. In particular, the at least one motor may have a rated power of at most 5000 watts and further in one form at least 2000 watts. Good results regarding the compact design, the own weight and sufficient power to be able to rotate the respective centrifuge basket about its basket axis in combination with the respective reduction gear were achieved with the at least one motor whose rated power lies in a range of 2500 watts and 3800 watts.

The respective drivetrain may comprise a reduction gear having a gear housing fixed to the basket carrier, a driving element rotatably drivable by the at least one motor, and a driven element coaxial with the basket axis, wherein a transmission ratio between an input speed of the driving element and an output speed of the driven element is greater than one. The input element may be, for example, an input shaft. The input element may be rotatably mounted in the transmission housing. In one form, the drive element of the respective reduction gear is rotatably mounted about the respective basket axis and may be arranged concentrically to the respective basket axis in the gear housing. The gearing output of the belt drive can be coupled to the gearing input of the reduction gearing. For this purpose, the driven pulley of the belt drive can be connected to a drive element of the reduction gear. In particular, the driven pulley can be fixed to the input shaft. It is further possible that one of the at least one motor rotatingly drives the drive element directly, so that no belt drive would be necessary for power transmission. The transmission ratio (abbreviated as “i”), which is defined as the quotient of input speed, i.e. the speed of the transmission input (here: the input element), and output speed, i.e. the speed of the transmission output (here: an output element), is always greater than 1 for the respective reduction gear. In one form, the transmission ratio of the reduction gears is in a range from i=50 to i=200. In particular, the reduction ratio can be between i=90 and i=120. It is expedient that the respective reduction gear has a fixed transmission ratio. Furthermore, the reduction gear and/or a gear housing of the reduction gear can be arranged concentrically to the respective basket axis.

The respective reduction gear can be an eccentric gear. Due to its axially compact design, this is particularly suitable for use on the basket carrier with the slow gear ratios required here. The eccentric gears can, for example, be cycloidal gears in which cam discs transmit torques in a rolling manner. The cycloidal gears do not need gear wheels and are not exposed to shear forces, which makes them robust and durable. Such a reduction gear is, for example, the TwinSpin reduction gear from the G series of the company Spinea®. Particularly good results with regard to the reduction ratio and the associated torque increase as well as with regard to durability have been achieved, for example, with the reduction gear model TS 335G from the G series of Spinea®. Furthermore, the respective reduction gear can be combined with at least one radial-axial bearing, which can be accommodated in the gear housing. Generally, however, other reduction gears such as planetary gears or the like are also possible. The reduction gears can be inserted into the through holes provided concentrically to the basket axes in the main body of the basket carrier and fastened, in particular screwed, to the main body. The reduction gears can each have a hollow shaft, wherein the lines for actuating the first connectors are guided through the hollow shafts.

Furthermore, the rotary platforms can each be attached to the output element of the reduction gear. In one form, the entire weight of the rotary platforms and the attachments mounted therein, such as connection assemblies, sensors, etc., as well as the centrifuge baskets coupled during operation of the installation, rests on the output elements of the reduction gears. In other words, the output elements can be the sole connecting element between the rotary platforms and the basket carrier. The rotary platforms may be suspended from the output elements and may be drivable together with the output elements to rotate synchronously about the basket axes. To ensure collision-free rotation of the rotary platforms about the basket axes, the respective output element may project axially beyond the edge of the gearbox housing. In particular, the output elements can project axially by about 0.5 millimeters to 5 millimeters, and further in one form by about 1 millimeters, from an underside of the respective transmission housing. Alternatively, the rotary platforms can also be plate-shaped with a central recessed section that can be attached to the respective output element.

The rotary platforms can each have a central opening. The rotary platforms can protrude flange-like and/or radially to the respective basket axis from the output end of the reduction gear. The first connectors, sensors and other add-on parts can be arranged in the portion of the respective rotary platform that projects radially beyond the respective gearbox housing. The respective output element can be, for example, a ring gear, an output shaft, an output flange or the like of the reduction gear. The respective output element can be formed annular and/or flange-shaped. The first connectors of the connection assemblies can be arranged on the rotary platforms in order to detachably connect the centrifuge baskets to the rotary platforms and/or the basket carrier. As the rotary platforms are suspended from the output elements, the output elements carry the centrifuge baskets. To ensure that the reduction gear can safely accommodate the axial and radial forces and, above all, tilting moments resulting from the operation of the assembly, the output elements can be mounted rotatably around the basket axes in the gearbox housings by rolling bearings, in particular roller bearings. For this purpose, it is advantageous if the output elements have, as in one form, a large outer radius. In one form, the outer diameter of the output element of the respective reduction gear corresponds to 0.5 to 1.0 times the outer diameter of the gearbox housing.

In order to guide the lines for actuating the first connectors from the main body to the rotary platforms, the input shafts can be designed as hollow shafts. Furthermore, the output elements can be hollow. In particular, the respective output element can have a hollow cylindrical output shaft to which the ring gear or the output flange is attached or integrally connected on the output side. The output shaft can be inserted into the input shaft and be mounted so as to be rotatable relative to the input shaft about the respective basket axis. For example, a needle bearing can serve as a bearing. Accordingly, the inner diameter of the input shaft may be larger than the outer diameter of the output shaft. Again, the outer diameter of the output flange may be larger than the outer diameter of the input shaft. In one form, the outer diameter of the output flange is more than three times the outer diameter of the input shaft and, in particular, less than eight times the outer diameter of the input shaft. The output shafts can project axially from the input shafts on the gearbox input side, so that the secondary rotary lead-throughs can be arranged at the projecting ends of the output shafts. In this way, the second bodies of the secondary rotary joints can be connected to the output shafts in a rotationally fixed manner. As a result, during operation of the installation, when the at least one motor drives the drivetrains, the second bodies of the secondary rotary joints as well as the rotary platforms are driven in rotation about the respective basket axis by their rotationally fixed connection to the output elements at the output speed.

The installation can comprise at least two centrifuge baskets into which the mass parts to be treated can be filled, in particular poured. In order to reduce the restoring torques generated by the rotating centrifuge baskets during operation of the installation, the centrifuge baskets can be divided into several, in particular two or three chambers. Compared to a centrifuge basket with only one central chamber, the restoring torques are reduced by about 60 percent in the centrifuge basket with three chambers. In this way, the secondary drive device is relieved when rotating the centrifuge basket around the basket axes. The chambers are spatially separated from each other in the respective centrifuge basket. The walls of the centrifuge basket can be perforated or provided with holes. In one form, an uneven number of chambers is provided in order to maximise the total volume of the centrifuge baskets.

In particular, the main body is configured rotationally symmetrical to the main axis. For example, the main body of the basket carrier can be configured in the form of a rotating crossbeam for two of the centrifuge baskets, wherein two of the rotary platforms can be arranged at the rotating crossbeam. Alternatively, the main body of the basket carrier can also be designed in the form of two cross-shaped rotating crossbars for four of the centrifuge baskets, wherein two of the rotary platforms can be arranged on each rotating crossbar. Similarly, the main body of the basket carrier may be circular or polygonal in axial view, wherein two, three, four, five or six of the rotary platforms may be arranged at the main body. In one form the basket carrier and the secondary drive device arranged on the basket carrier are designed to be at least substantially rotationally symmetrical with respect to the main axis in order to minimise imbalances when the basket carrier rotates about the main axis. In one form, the main body rotates in a horizontal plane to which the main axis is perpendicular.

The basket holder can be rotatably driven by the main drive at a nominal speed of at least 30 revolutions per minute and a maximum of 220 revolutions per minute. Particularly good results have been achieved with a nominal speed of about 200 revolutions per minute. The main drive is in one form dimensioned such that the desired nominal speed can be reached within at most 10 seconds, and further in one form within about 5 seconds. During the centrifuging process, the centrifuge baskets, respectively the mass parts taken up, can be subjected to loads of more than 20 times the acceleration of gravity, respectively the weight force G. In one form, the load multiple is between 20 and 80. In particular, the load multiple can be about 25 to 40, and further in one form about 32. The load multiple n is defined as n times the weight force G. During operation of the installation, the rated speed can be maintained for a time interval of at least 10 seconds to 60 seconds. In particular, the nominal speed can be maintained for about 30 seconds. In one form, the rated speed is at least 60 revolutions per minute and further in one form more than 100 revolutions per minute. Additionally, the at least one motor of the secondary drive device may drive the centrifuge baskets in rotation about their basket axes. The basket speed may be up to 15 revolutions per minute. Overall, this ensures effective centrifuging of excess treatment liquid from the mass parts, so that the amount of coating liquid remaining on the mass parts and thus the coating thickness can be influenced by presetting the rotation time, the nominal speed, the directions of rotation and rotational speeds of the centrifuge baskets about the basket axes (in the same direction and/or in the opposite direction to the direction of rotation of the basket carrier about the main axis), etc. For example, the longer the nominal speed is held and the higher the nominal speed is, the more coating liquid is thrown off, with the result that the coating thickness on the mass parts is thinner. To obtain thicker coatings, the rotation time and the nominal speed can be reduced, for example.

The supporting element in which the longitudinal shaft is rotatably mounted can be a crossbeam of the supporting structure. The crossbeam may have a bore through which the longitudinal shaft passes. The main drive of the main drive device may be attached to the support element. The support element may be rigidly bound as a crossbeam of the support structure or may be pivotally supported about a horizontal axis at a stationary part of the support structure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
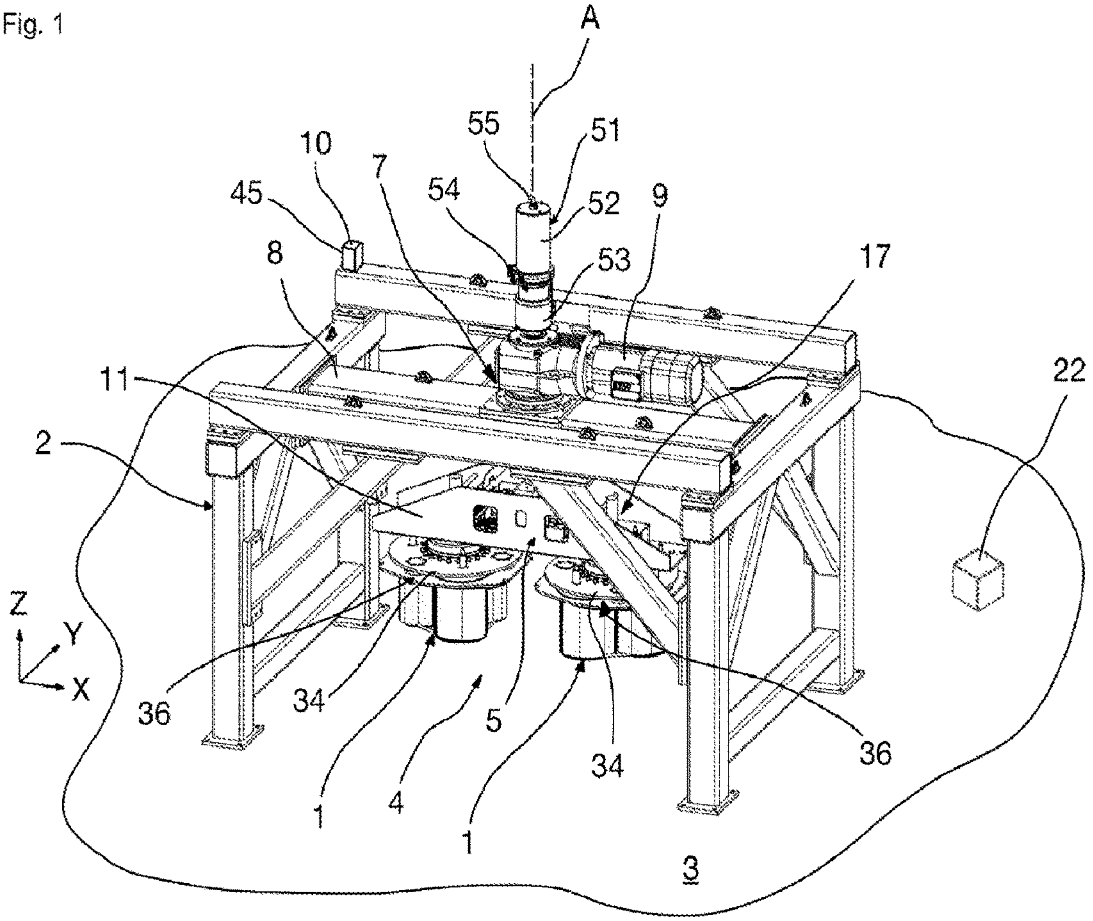
FIG. 1 is a perspective side view of a first form of an installation according to the present disclosure for treating mass parts contained in two centrifuge baskets, shown from diagonally above.
Figure 2:
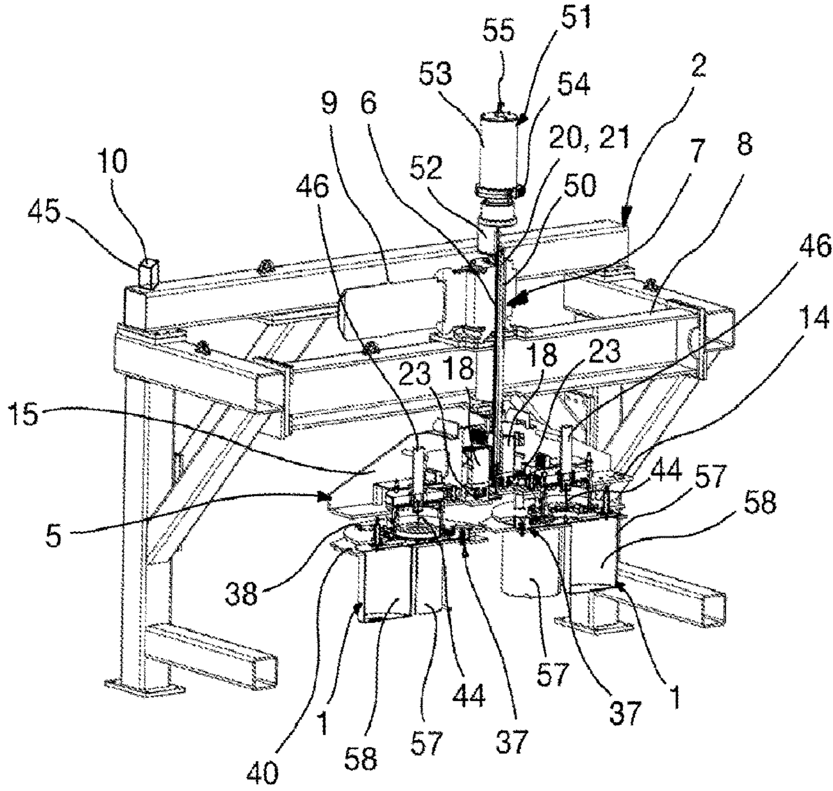
FIG. 2 is a perspective sectional view of the installation of FIG. 1.
Figure 3:
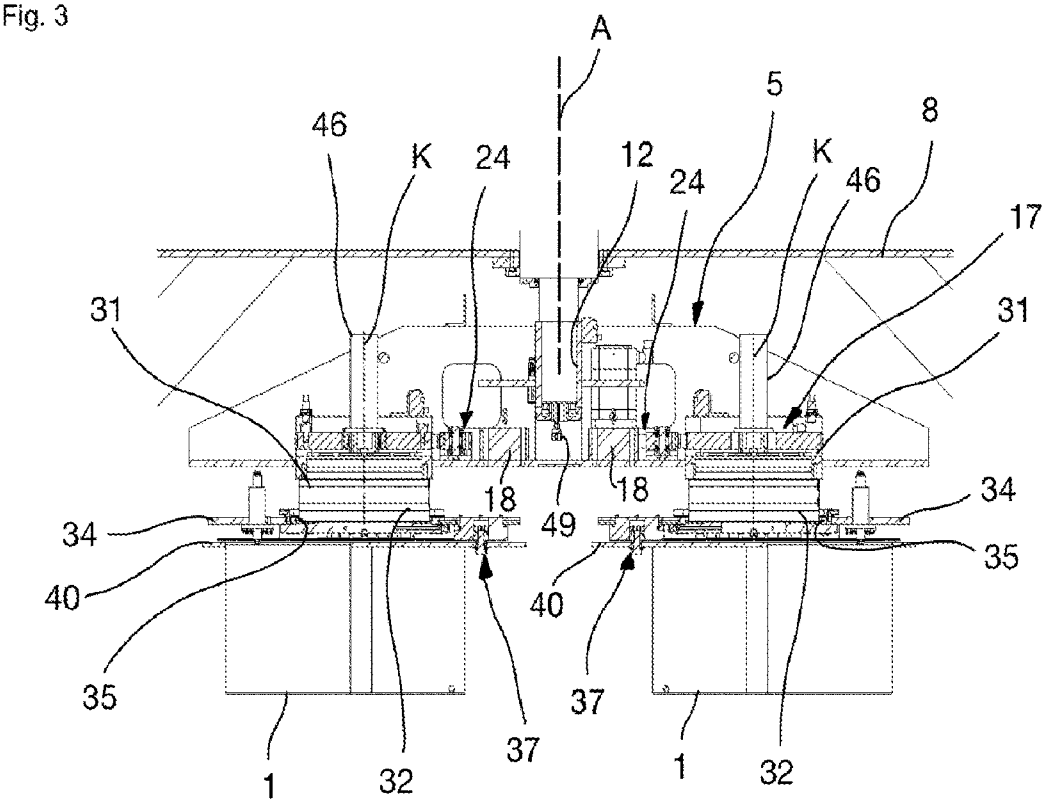
FIG. 3 is a cross-sectional view of a portion of the installation of FIG. 1.
Figure 4:
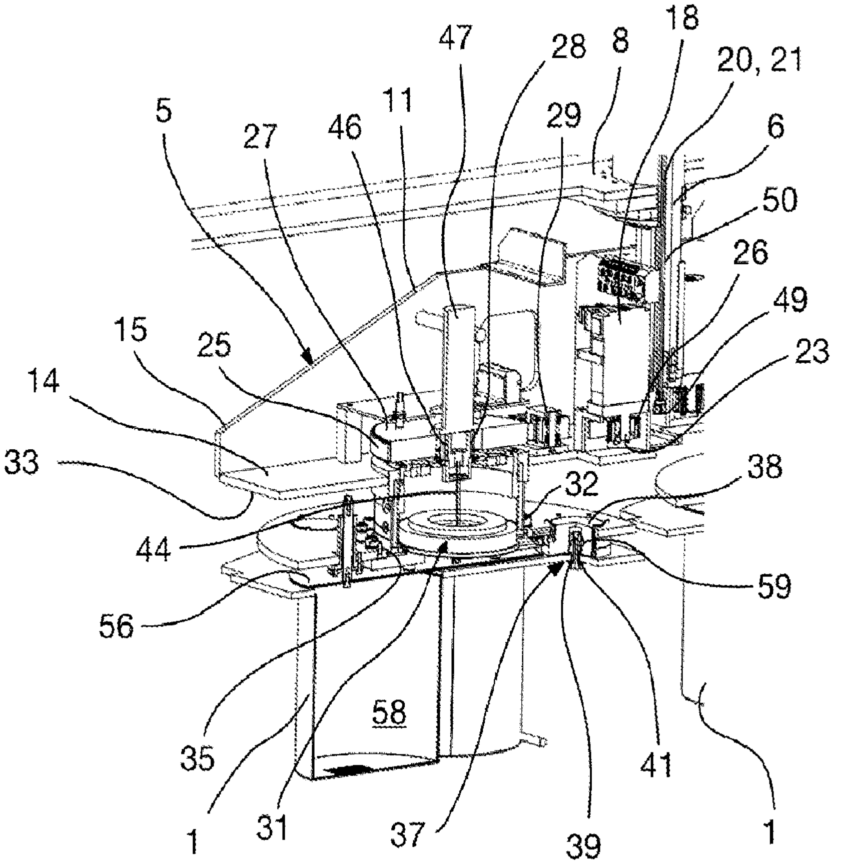
FIG. 4 is a perspective sectional view of a portion of the installation of FIG. 1.
Figure 5:
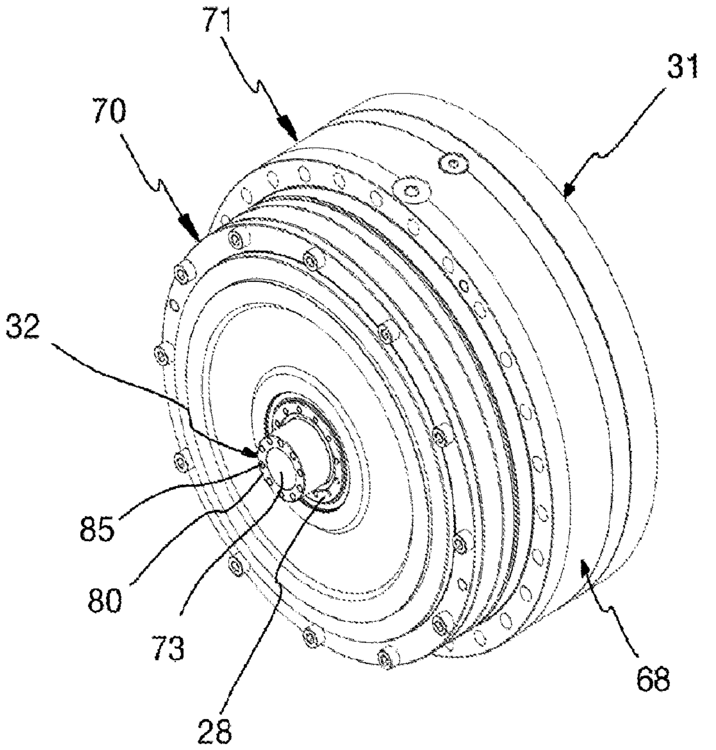
FIG. 5 is a perspective view of a reduction gear of the installation of FIG. 1 shown from above.
Figure 6:
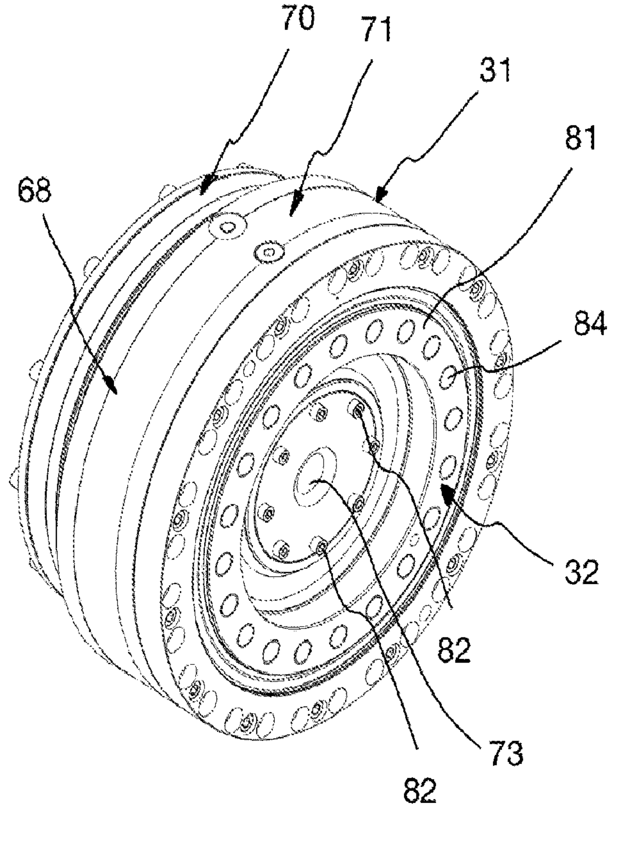
Figure 7:
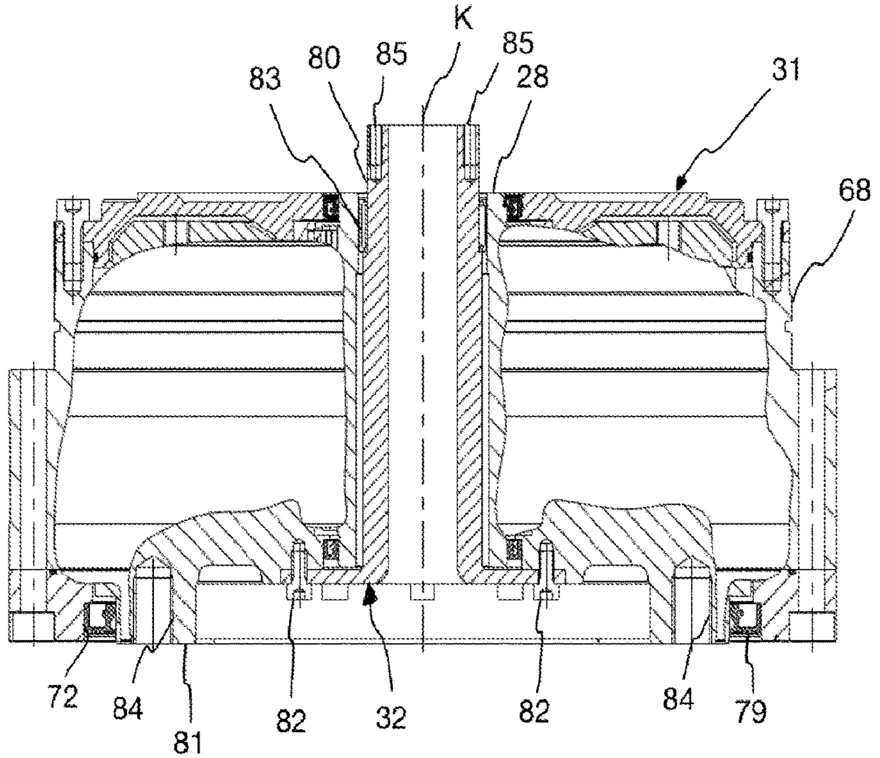
Figure 8:
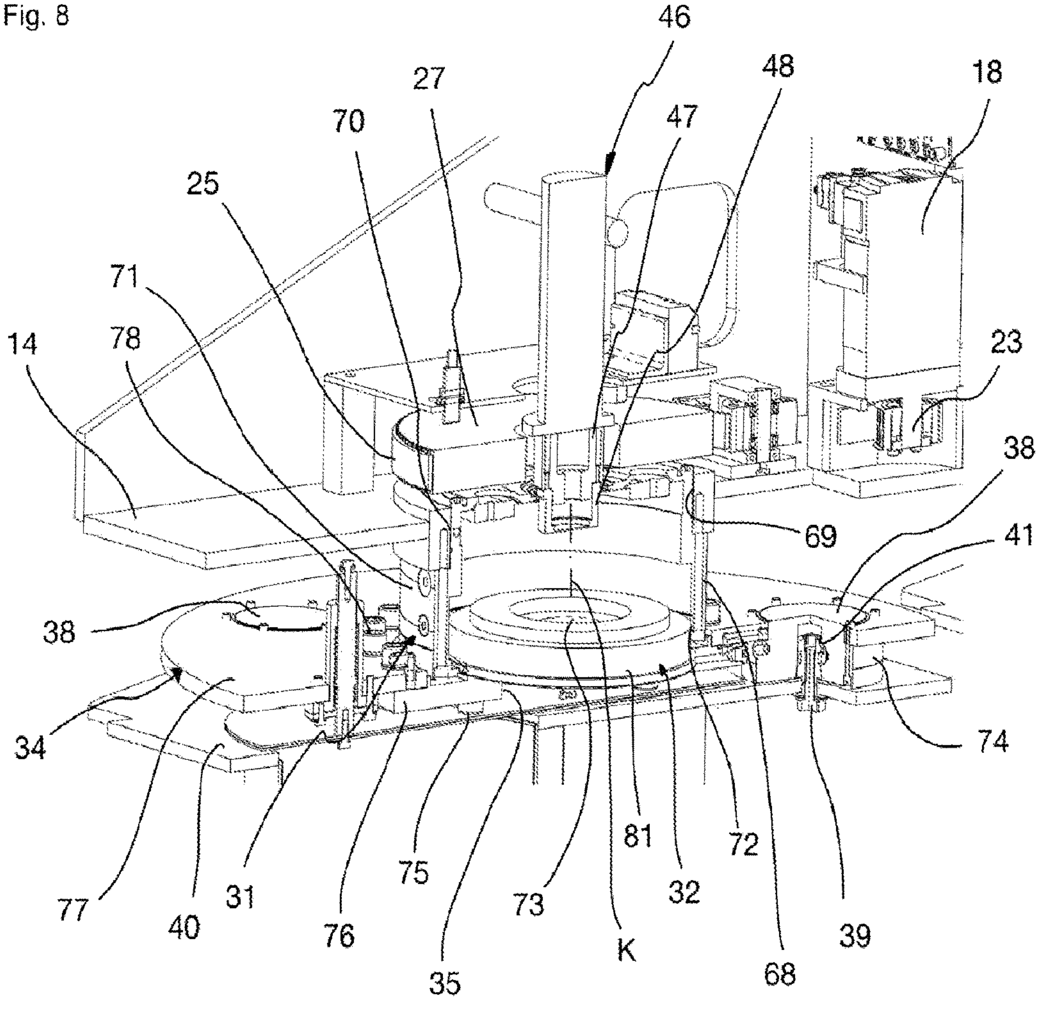
Figure 9:
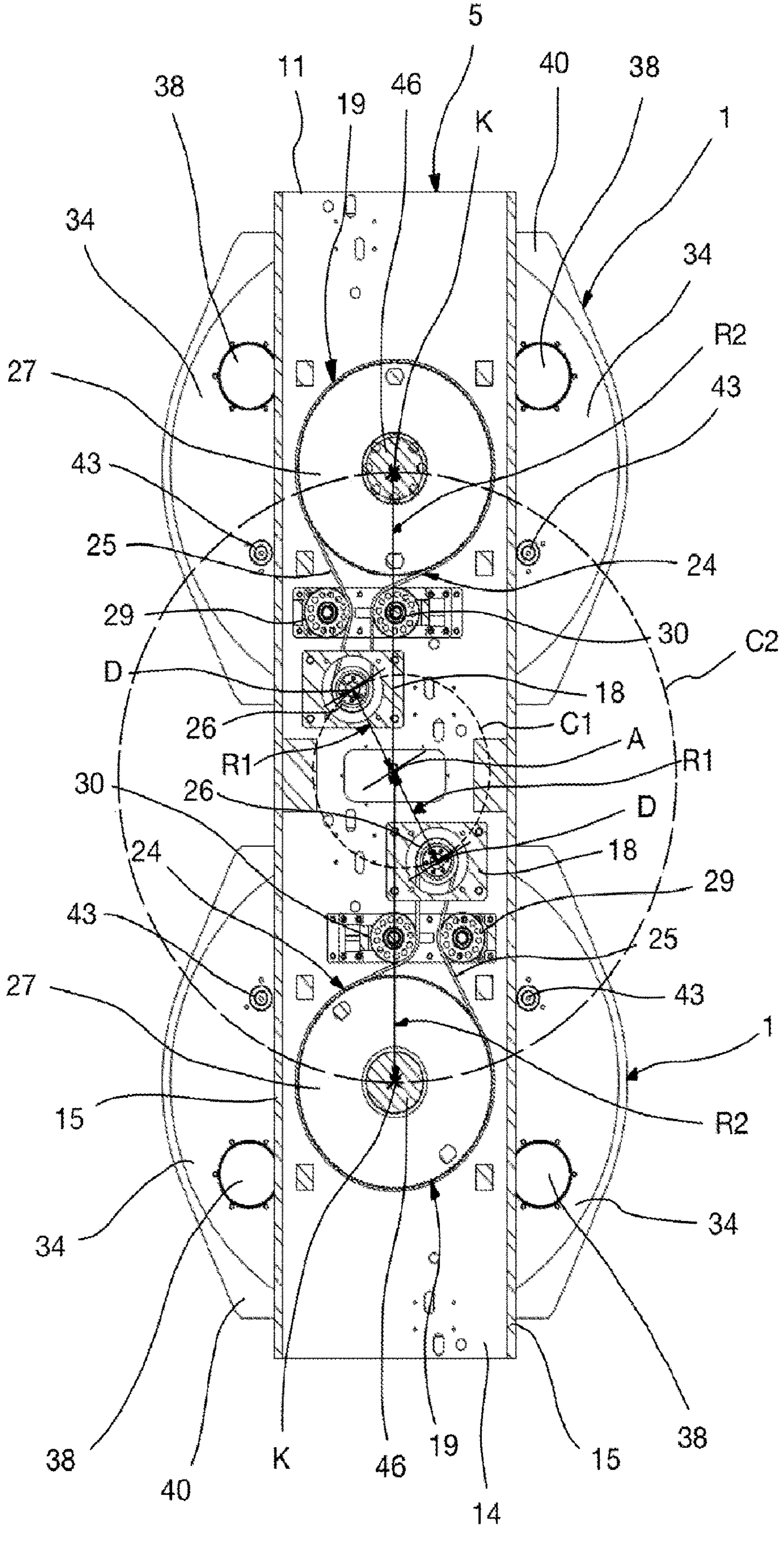
Figure 10:
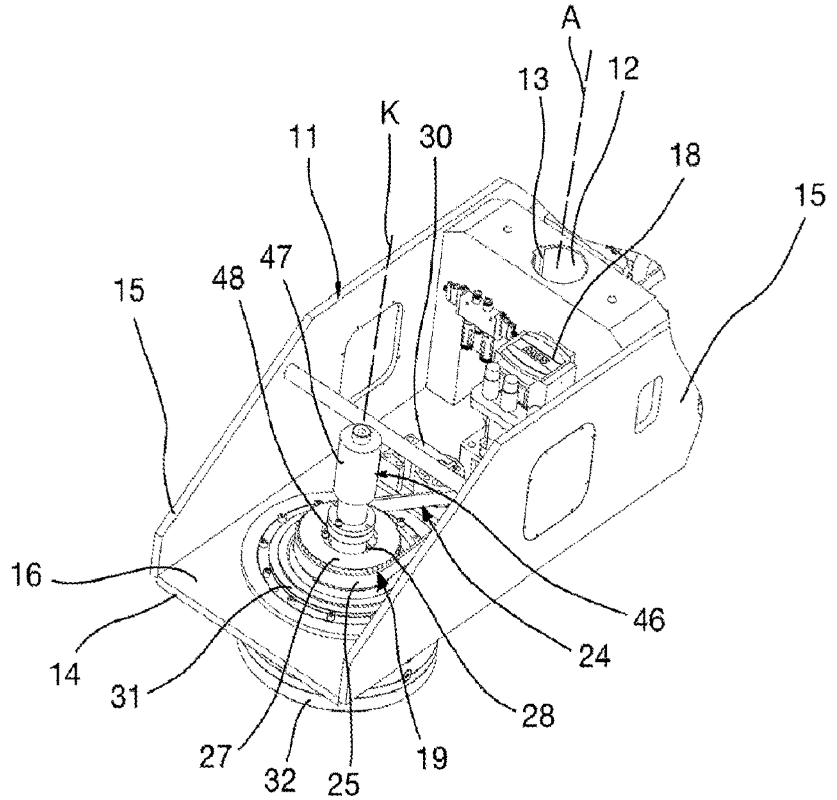
Figure 11:
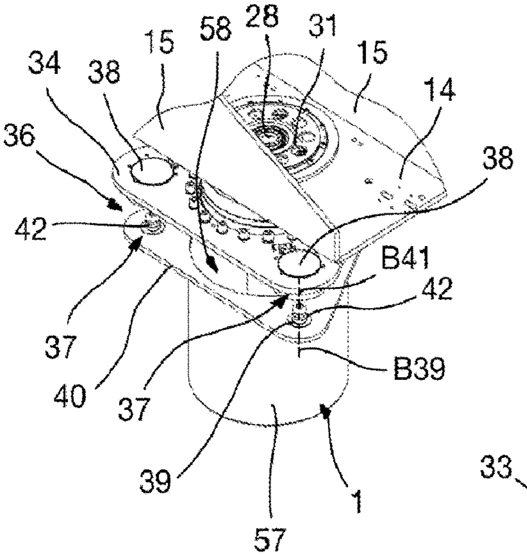
Figure 12:
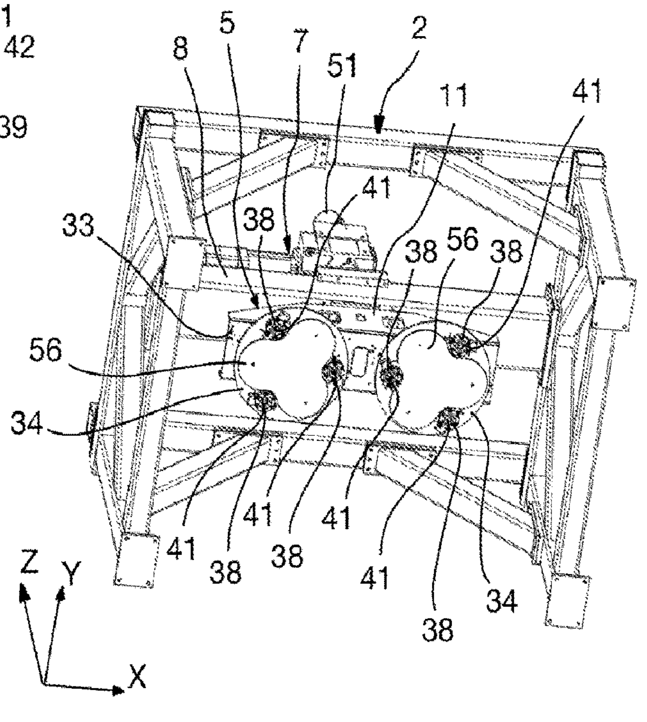
Figure 13:
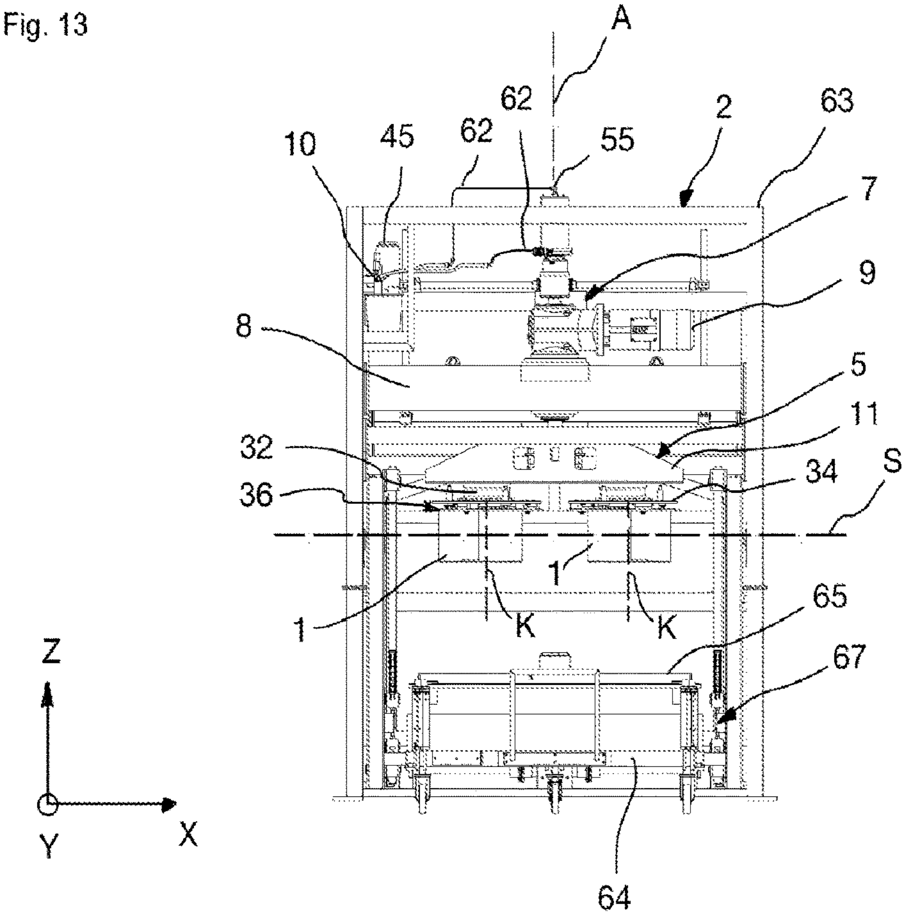
Figure 14:
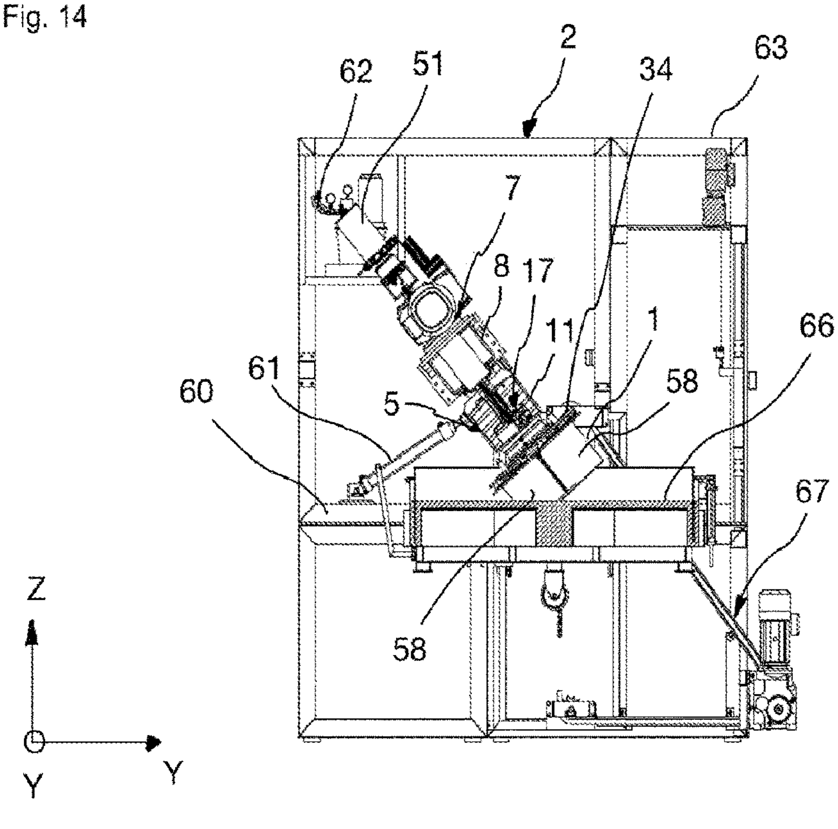
Figure 15:
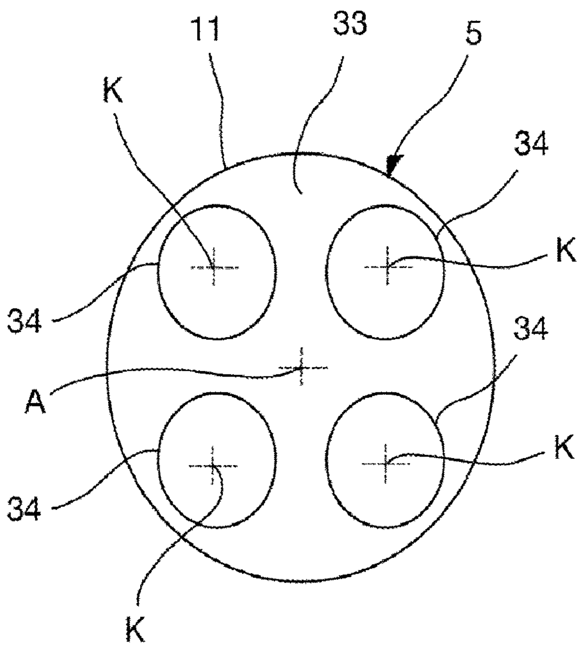
Figure 16:
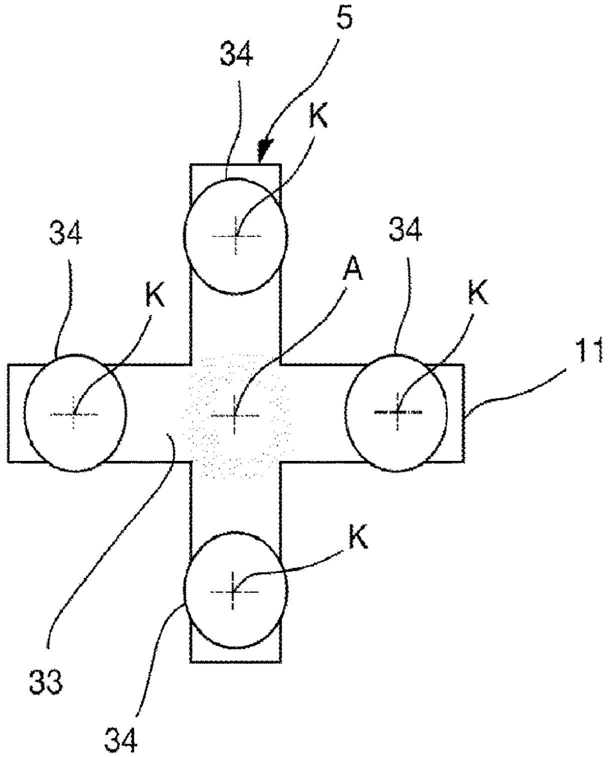

FIG. 6: is a perspective view of the reduction gear of FIG. 5 shown from below;

FIG. 7 a partial sectional view of the reduction gear of FIG. 5;

FIG. 8 is a perspective view of a portion of the installation of FIG. 1;

FIG. 9 is a top view of a basket carrier of the installation of FIG. 1;

FIG. 10 is a perspective view of a portion of the basket carrier of FIG. 9;

FIG. 11 is a perspective view of a portion of a connection assembly of the installation of FIG. 1;

FIG. 12 is a perspective view of the installation of FIG. 1 shown from below, wherein the installation is shown without the centrifuge baskets;

FIG. 13 is a side view of an installation of a second form according to the present disclosure for treating mass parts contained in two centrifuge baskets, wherein the installation is shown in an initial position;

FIG. 14 is a sectional view of the installation shown in FIG. 13, wherein the installation is shown in a pivot position in which the centrifuge baskets are immersed in a dip tank in accordance with the present disclosure;

FIG. 15 is a schematic view of an installation of a third form according to the present disclosure for treating mass parts contained in four centrifuge baskets, in which a basket carrier is shown from below; and FIG. 16 is a schematic view of an installation of a fourth form according to the present disclosure for treating mass parts contained in four centrifuge baskets, in which a basket carrier is shown from below.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows an installation for treating mass parts contained in two centrifuge baskets 1 according to a first form. FIGS. 2 to 12 show further details of this installation. The installation is used for coating bulk parts (not shown), such as screws, stamped parts or the like, wherein the bulk parts to be coated can be immersed in a coating liquid (not shown) and then centrifuged outside the coating liquid.

FIG. 1 shows that the installation has a supporting structure 2 in the form of a stationary frame. The supporting structure 2 is supported against a fixed floor 3 and encloses a workspace 4. To clarify the orientation of the supporting structure 2, the three spatial directions X, Y and Z are drawn in FIG. 1. The spatial direction Z runs parallel to the vertical, respectively to the direction of gravity. The designations "down", "up", "below" and "above" are to be understood as positional indications in relation to the Z direction. The term "horizontal" is to be understood as an extension parallel to a plane spanned by the two spatial directions X and Y.

Furthermore, the installation includes a basket carrier 5 on which the two centrifuge baskets 1 are held in a reversibly detachable manner. The basket carrier 5 is mounted freely suspended in the workspace 4 on a longitudinal shaft 6 of a main drive device 7. The longitudinal shaft 6 is mounted on a supporting element 8 of the supporting structure 2 so as to be rotatable about a main axis A and can be rotationally driven about the main axis A by a main drive 9 of the main drive device 7. The main drive 9 is fixed to the supporting element 8. The support element 8 may be a cross beam that is rigidly incorporated into the support structure 2. The main drive 9 may be an electric motor connected to an electric power supply 10 of the installation. By means of the main drive 9, the basket carrier 5 can be rotatably driven about the main axis A to a desired nominal speed, in one form within five seconds, which nominal speed may be more than 30 revolutions and less than 220 revolutions per minute.

The basket carrier 5 includes a main body 11 with a central bore 12, see in particular FIG. 10. A lower end of the longitudinal shaft 6 facing the basket carrier 5 is inserted into the central bore 12, wherein the longitudinal shaft 6 is not shown in FIG. 10 to illustrate the structure of the basket carrier 5. The longitudinal shaft 6 and the main body 11 can be connected to each other by means of a standardised shaft-hub connection, such as a form-locking connection with a groove 13 and a key (not shown). The main body 11 has an elongated base plate 14 and two side walls 15 spaced apart from each other. The side walls 15 project vertically from the base plate 14 on an upper side 16 facing the support element 8 and may have a trapezoidal basic shape. The base plate 14 is aligned horizontally.

A secondary drive device 17 for rotating the centrifuge baskets 1 about a respective basket axis K radially spaced from the main axis A is arranged on the main body 11 between the side walls 15. Due to their eccentric arrangement, the two basket axes K can also be referred to as planetary rotary axes. The secondary drive device 17 has a motor 18 and a drivetrain 19 for each centrifuge basket 1. The motors 18 are electric motors, in particular servomotors. The longitudinal shaft 6 is designed as a hollow shaft through which electrical lines 20 are routed to connect the motors 18 to an electrical power supply 10 of the installation. Furthermore, control lines 21, in particular bus lines, can be routed through the longitudinal shaft 6 for connecting the secondary drive device 17 to a control unit 22 of the installation. The main drive device 7 can also be connected to the control unit 22.

In order to reduce the centrifugal forces acting on the motors 18 to a minimum when the basket carrier 5 rotates about the main axis A, the motors 18 are attached to the main body 11 in one form close to the main axis A. Specifically, the motors 18 each have a rotor shaft 23 that is rotatably drivable about a rotor axis D that is arranged parallel to the main axis A. The respective rotor axis D is arranged at a distance R1 of at most 300 millimeters from the main axis A and may have a distance R1 of between approximately 140 millimeters and 180 millimeters. To avoid imbalances, the motors 18 are arranged on the main body 11 symmetrically to each other with respect to the main axis A. In one form, the rotor axes D lie on an imaginary first circle C1, which is arranged concentrically to the main axis A and has the radius R1, as shown in FIG. 9. The basket axes K, on the other hand, can lie on an imaginary second circle C2, the radius R2 of which is larger than the radius R1. In particular, the radius R1 can be smaller than 0.5 times the radius R2.

The drivetrains 19 each include a belt drive 24. A respective belt drive 24 is described below. It is understood that the explanations apply to both belt drives 24, which are identical in construction. The belt drive 24 comprises a toothed belt 25 and two toothed pulleys, namely a drive pulley 26 and a driven pulley 27. The drive pulley 26 is mounted concentrically to the rotor axis D on the rotor shaft 23 of the associated motor 18. The driven pulley 27 is mounted concentrically to the basket axis K on an input shaft 28 formed as a hollow shaft. Furthermore, the belt drive 24 comprises a fixedly adjustable tensioning device with a first tensioning roller 29 and a spring-loaded tensioning device with a second tensioning roller 30. The transmission ratio (abbreviated as "i"), which is defined as the quotient of the speed of the transmission input (here: the drive pulley 26) and the speed of the transmission output (here: driven pulley 27), can lie in a range of i=1.5 to i=10 for the belt drive 24. Here, the transmission ratio is in a range from i=2 to i=6. As a result of the fact that i>1, the speed is reduced ("transmission to slow") and the transmittable torque is increased. In one form, it can be advantageous for the respective belt drive to have a fixed transmission ratio.

Furthermore, the drivetrains 19 each have a reduction gear 31, which further increases the transmittable torque. This allows the centrifuge baskets 1 to be rotatably driven about the basket axes K with a sufficiently high torque of, for example, 1000 to 2500 Newton meters. The reduction gears 31 may be known eccentric gears. An eccentric on the rotating input shaft 28 can generate a cycloidical motion, involving pins arranged circumferentially around the basket axis K in a gearbox housing 68 of the respective reduction gear 31. Such a reduction gear 31 is, for example, the TwinSpin reduction gear from the G series of the company Spinea®. Particularly good results with regard to the reduction ratio and the associated increase in torque as well as with regard to durability were achieved, for example, with the reduction gear model TS 335G from the G series of Spinea®. The respective reduction gear 31 is described below. It is understood that the descriptions apply to both reduction gears 31, which are identical in construction. The reduction gear 31 is shown in detail in FIGS. 5 to 7.

The reduction gear 31 is inserted in a through hole 69 in the base plate 14 of the main body 11 and is firmly connected, in particular screwed, to the main body 11. The gear housing 68 is in particular flange-shaped and has a stepped outer wall. A first outer wall section 70 of the gear housing 68, which is inserted in the base plate 14, may have a smaller outer diameter than a second outer wall section 71 of the gear housing 68, which projects beyond the main body 11 on the basket side. The inner diameter of the through bore 69 corresponds at least substantially to the outer diameter of the first outer wall section 70 of the gear housing 68. The gear housing 68 of the reduction gear 31 protrudes from a lower side 33 of the main body 11, the lower side facing away from the upper side 16. The reduction gear 68 is, in this case, inserted from below into the through-hole 69 in the base plate 14 and, in particular, screwed to the latter from below.

The input shaft 28 is the gearbox input side shaft of the reduction gear 31. The input shaft 28 is mounted in the gear housing 68 concentrically to the basket axis K and so as to be rotatable about the basket axis K. The reduction gear 31 comprises a hollow output element 32 on the gearbox output side. The output element 32 comprises a hollow cylindrical output shaft 80 and an output flange 81 connected to the output shaft 80 in a rotationally fixed manner. The output flange 81 and the output shaft 80 are, here, screwed together by screws 82, wherein for the sake of simplicity only a subset of the screws are provided with the reference sign. The output shaft 80 is inserted in the hollow input shaft 28 and can be supported by a bearing 83, in particular a needle bearing, so as to be rotatable relative thereto about the basket axis K. The hollow output element 32 thus forms a passage 73 through the reduction gear 31.

The gear ratio (abbreviated as "i") of the reduction gear 31, which is defined as the quotient of the speed of the gear input (here: the input shaft 28) and the speed of the gear output (here: the output element 32), can be in a range from i=50 to i=200 for the reduction gear 31. In particular, the reduction ratio can be between i=90 and i=120.

An outer diameter of the output element 32, in particular the output flange 81 can be more than 4 times an outer diameter of the input shaft 28. FIG. 7 shows that this ratio is in one form about 5 to 1. In one form this ratio is less than 8 to 1 and in one form less than 6 to 1.

A flange-like rotary platform 34 is attached to the lower, or basket-side end of the respective output element 32, in particular to the output flange 81. The gearbox housing 68 protrudes from the underside 33 of the main body 11 and the output element 32 projects beyond the gearbox housing 68 by about 0.5 millimeters to 5 millimeters and, here, in one form by about 1 millimeters. The rotary platform 34 is suspended from the output element 32 and can be rotationally driven about the basket axis K without collision due to the protruding output element 32. The rotary platform 34 can be screwed to the output element 32 by a plurality of circumferentially distributed screws 75, with threaded holes 84 being incorporated circumferentially therein for this purpose. In particular, the rotary platform 34 may be secured to the output member 32 by twenty to thirty of the screws 75 to hold the rotary platform 34 freely suspended from the output member 32. The flange-like rotary platforms 34 may each have an opening 35 formed concentrically with respect to the basket axis K.

It can be seen in particular in FIG. 8 that the rotary platform 34 is multi-piece and includes an annular first plate 76 which is attached to the output element 32 by the screws 75. A second annular plate 77, which is screwed to the first plate 76 by means of a plurality of screws 78, is located radially further out. The second plate 77 is arranged from above, respectively from the side facing away from the basket, onto the first plate 76. A respective centrifuge basket 1 can be detachably attached to the rotary platform 34. In order to support the forces occurring in the axial and radial directions during operation of the installation, as well as the moments, such as tilting moments, the output element 32 is inserted in a housing opening 72 of the gear housing 68 and is mounted rotatably relative to the gear housing 68 about the basket axis K. For example, rolling bearings, in particular roller bearings, can be provided, which can also be configured in several rows or with rollers alternately rotated 90 degrees to each other around the circumference, in order to be able to absorb the radial and axial forces. The outer diameter of the output element 32 may correspond to about 75 percent to 95 percent, and in one form about 85 percent, of an outer diameter of the transmission housing 68 in the second outer wall section 71. A bearing, in particular a roller bearing, is in one form arranged between the circumferential surface of the output element 32 and the inner wall of the gearbox housing 68. A sealing ring 79 can be connected axially below the bearing. The rotary platforms 34 attached to the output elements 32 are thus drivingly connected to the associated motor 18 via one of the drivetrains 19 in each case and, due to the mechanical separation of the two drivetrains 19, can be rotatingly driven about the respective basket axis K independently of each other by the respective associated motor 18.

For reversibly detachably connecting the centrifuge baskets 1 to the basket carrier 5, a connecting assembly 36 is provided for each centrifuge basket 1. The connecting assemblies 36 each have, in this embodiment, three connector units 37. The connector units 37 are equally distributed in the circumferential direction around the basket axis K and can be arranged respectively at the same distance from the respective basket axis K, as can be seen in particular in FIG. 12. The connector units 37 each have a first connector in the form of a clamping module 38 and a second connector in the form of a connecting bolt 39. The clamping modules 38 are attached to the rotary platforms 34 and the connecting bolts 39 are attached to the centrifuge baskets 1.

It can be seen in particular in FIG. 11 that the centrifuge baskets 1 each have a radially projecting connecting flange 40 at their open end. The connecting flange 40 is arranged perpendicular to the basket axis K, at least when the centrifuge basket 1 is held on the basket carrier 5. The connecting bolts 39 are attached to the connecting flange 40 of the respective centrifuge basket 1 and project axially. The connecting bolts 39 each have a bolt axis B39 which is arranged parallel to the main axis A. The connecting flange 40 can have an oval base, as shown in FIG. 9, or a triangular base, as shown in FIG. 11. Other bases are also possible, such as a circular, rectangular, square or polygonal base.

The clamping modules 38 are arranged in a section 77 of the respective rotary platforms 34 that projects radially beyond the reduction gear 31. The rotary platforms 34 can, for example, have a round or angular basic shape. The clamping modules 38 each have a module base member 74 in which a bolt receptacle 41 is formed, which is open downwards, i.e. towards the respective centrifuge basket 1, and into which the connecting bolts 39 can be inserted. The bolt receptacles 41 each define a center axis B41 which, like the bolt axes B39, are arranged parallel to the main axis A. The bolt receptacles 41 are substantially cup-shaped. For radial fixation of the connecting bolts 39 in the inserted state, the respective module base member 74 surrounds the bolt receptacle 41 in the circumferential direction about the center axis B41, in particular completely. The clamping modules 38 each further include a locking mechanism 59 that clamps the inserted connecting bolt 39 in the clamping module 38 (connected state). The connecting bolts 39 can each have a circumferential groove 42 in which form-locking elements, in particular locking bolts of the locking mechanisms 59 can engage in the connected state. The form-locking elements are in one form spring-loaded towards the center axis B41 so that the connecting bolts 39 inserted into the bolt receptacles 41 in the connected state are clamped by spring force. The clamping modules 38 are pneumatically operable centering clamps known per se, which can be pressurised with compressed air to release the locking mechanisms 59, respectively to displace the form-locking elements against the spring force and thus away from the center axes B41. In a released state, the locking mechanisms 59 release the connecting bolts 39 again, so that the connecting bolts 39 can be axially displaced relative to the clamping modules 38. In the released state, the centrifuge baskets 1 can thus be uncoupled from the basket carrier 5, as shown in FIG. 11.

The clamping modules 38 are connected to pneumatic lines 44 via plug-in couplings 43, which connect the clamping modules 38 to a pneumatic supply network 45 of the installation. Furthermore, the control lines 21 and, if required, the power lines 20 can be routed to the clamping modules 38 in order to connect them to the control unit 22 and, if required, to the electrical power supply 10. The lines 44, 20, 21 coming from the rotary platforms 34 are passed through the hollow input shafts 28, respectively the through-opening 73 of the output element 32 of the reduction gears 31 into a respective secondary rotary lead-through 46. The secondary rotary lead-throughs 46 are each connected to an end of the output element 32 facing away from the rotary platform 34, in particular to the output shaft 80. Simply to illustrate the structure, most of the components inside the reduction gear 31 have been removed in FIGS. 2, 4 and 8. It can be seen that a first body 47 of the respective secondary rotary lead-through 46 is supported with respect to the main body 11 of the basket carrier 5. A second body 48 of the respective secondary rotary lead-through 46 is connected to the output shaft 80 in a rotationally fixed manner. For this purpose, a plurality of circumferentially distributed threaded holes 85 are formed in the end face of the output shaft 80 in order to screw the second body 48 to the output shaft 80. The secondary rotary lead-throughs 46 enable the sealed transition of the pneumatic lines 44 between the fixed first bodies 47 and the second bodies 48, which can be rotatably driven about the basket axes K, in a manner known per se.

The pneumatic lines 44 are routed on the upper side 16 of the main body 11 towards the main axis A and are connected there to a Y-connector 49. The Y-connector 49 is connected to a central pneumatic line 50, which is passed through the longitudinal shaft 6, which is designed as a hollow shaft. A central rotary lead-through 51 is arranged at an upper end of the longitudinal shaft 6 facing away from the basket carrier 5. The central rotary lead-through 51 has a first body 52, which is supported with respect to the supporting structure 2. A second body 53 of the central rotary lead-through 51 is non-rotatably connected to the longitudinal shaft 6. The electrical lines 20 and the control lines 21 for the secondary drive device 17 and the pneumatic line 44 for the clamping modules 38 are routed through the central rotary lead-through 51. Contact points 54 are arranged on the first body 52 of the central rotary lead-through 51 for connecting the electrical lines 17 to the power supply 10 and for connecting the control lines 21 to the control unit 22. Furthermore, a pneumatic coupling 55 is arranged on the first body 52 of the central rotary lead-through 51, via which the pneumatic line 50 can be connected to the pneumatic supply network 45.

FIG. 12 shows the installation from below at an angle. It can be seen that for each rotary platform 34 a cover 56 is arranged between the clamping modules 38 arranged at the rotary platforms 34. The covers 56 are used to close the centrifuge baskets 1, that are open at the top, when they are held on the basket carrier 5. The centrifuge baskets 1 have perforated walls 57 that can be penetrated by the coating liquid. The walls 57 divide the respective centrifuge basket 1, here, into three spatially separated chambers 58 for receiving the mass parts. The chambers 58 are arranged distributed in the circumferential direction and are open at the top in order to be able to fill in the mass parts. The centrifuge baskets 1 are designed rotationally symmetrical to the basket axis K. By subdividing the centrifuge baskets 1 into the chambers 58, the restoring torques are minimised when the centrifuge baskets 1 are rotated about the basket axes K. As a result, the centrifuge baskets 1 filled with the mass parts can be set in rotation about the basket axes K more easily, which reduces the load on the motors 18.

FIGS. 13 and 14 show an installation for treating mass parts contained in two centrifuge baskets 1 according to a second embodiment. This embodiment differs from the first embodiment described above according to FIGS. 1 to 12 only in that the support element 8 is integrated in the support structure 2 pivotably about a horizontal pivot axis S, so that reference is made to the above explanations with regard to the common features. Overall, the same details are provided with the same reference signs as in FIGS. 1 to 12. To illustrate the orientation of the supporting structure 2, the three spatial directions X, Y and Z are drawn in FIGS. 13 and 14. The spatial direction Z runs parallel to the vertical, respectively to the direction of gravity. The designations "up", "down", "below" and "above" are to be understood as positional indications in relation to the Z direction. The term "horizontal" is to be understood as an extension parallel to a plane spanned by the two spatial directions X and Y.

The support element 8 can be a U-shaped swivel frame that is supported laterally on two horizontal side struts 60 of the support structure 2 so that it can be pivoted. Two hydraulic cylinders 61 can be provided for pivoting, which are supported on the side struts 60 and the support element 8. In order to bridge the swivelling movements, the lines 20, 21, 51 can be guided via one or more energy guiding chains 62 from the central rotary lead-through 51 to a stationary frame 63 of the supporting structure 2.

A coating trolley 64 with an immersion tank 65 is positioned in the work area 4, which can be pushed in and out of the work area 4 from the side. The coating liquid 66 is contained in the dip tank 65. In order to be able to raise or lower the coating trolley 64 with the dip tank 65, a lifting device 67 can be attached to the fixed part of the support structure 2, which is supported on the floor 3. The dip tank 65 can thus be moved along a vertical axis that extends along the spatial direction Z. The lifting device 67 can also be used in the installation according to the first embodiment, as shown in FIGS. 1 to 8, in order to be able to move the coating trolley 64 with the dip tank 65 towards the centrifuge baskets 1.

FIG. 13 shows the installation in an initial position with the paint trolley 64 on the floor 3. The main axis A of the longitudinal shaft 6, on which the basket carrier 5 is suspended, is aligned vertically. The basket carrier 5 and the centrifuge baskets 1 are stationary. In FIG. 14 the dip tank 65 on the coating trolley 64 is moved up to the basket carrier 5 from below. The centrifuge baskets 1 are immersed in the coating liquid 66. The support element 5 is pivoted about the pivot axis S so that the basket axes K form an angle of, here, about 30 degrees with the floor 3. The motors 18 rotatably drive the rotary platforms 34 about the basket axes K in order to circulate the mass particles contained in the centrifuge baskets 1 in the coating liquid 66.

FIGS. 15 and 16 show other possible geometries of the basket carrier 5, which can form a circular surface, as shown in FIG. 15, or can have the shape of a cross, or plus sign, as shown in FIG. 16.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller," "control unit," and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

List of reference signs

| | | | |
|---|---|---|---|
| 1 | centrifuge basket | 28 | input shaft |
| 2 | supporting structure | 29 | tensioning roller |
| 3 | floor | 30 | tensioning roller |
| 4 | workspace | 31 | reduction gear |
| 5 | basket carrier | 32 | output element |
| 6 | longitudinal shaft | 33 | lower side |
| 7 | main drive device | 34 | rotary platform |
| 8 | support element | 35 | opening |
| 9 | main drive | 36 | connecting assembly |
| 10 | power supply | 37 | connector unit |
| 11 | main body | 38 | clamping module |
| 12 | bore | 39 | connecting bolt |
| 13 | Groove | 40 | connecting flange |
| 14 | Base plate | 41 | bolt holder |
| 15 | Side wall | 42 | groove |
| 16 | upper side | 43 | plug-in coupling |
| 17 | secondary drive device | 44 | pneumatic line |
| 18 | motor | 45 | pneumatic supply network |
| 19 | drivetrain | 46 | secondary rotary lead-through |
| 20 | electric line | 47 | first body |
| 21 | control lines | 48 | second body |
| 22 | control unit | 49 | Y-connector |
| 23 | rotor shaft | 50 | pneumatic line |
| 24 | belt drive | 51 | rotary lead-through |
| 25 | toothed belt | 52 | first body |
| 26 | drive pulley | 53 | second body |
| 27 | driven pulley | 54 | contact point |
| 55 | coupling | 80 | output shaft |
| 56 | cover | 81 | output flange |
| 57 | wall | 82 | screw |
| 58 | chamber | 83 | bearing |
| 59 | locking mechanism | 84 | threaded hole |
| 60 | side strut | 85 | threaded hole |
| 61 | hydraulic cylinder | | |

-continued

| List of reference signs | | | |
|---|---|---|---|
| 62 | energy guiding chain | | |
| 63 | frame | | |
| 64 | paint wagon | | |
| 65 | dip tank | | |
| 66 | coating liquid | | |
| 67 | lifting device | | |
| 68 | gearbox housing | A | main axis |
| 69 | through hole | B | bolt axis, centre axis |
| 70 | outer wall section | C | imaginary circle |
| 71 | outer wall section | D | rotor axis |
| 72 | housing opening | K | basket axle |
| 73 | opening | R | radius |
| 74 | module base member | S | swivel axis |
| 75 | screw | X | space direction |
| 76 | plate | Z | space direction |
| 77 | plate | | |
| 78 | screw | | |
| 79 | sealing ring | | |

The invention claimed is:

1. An installation for treating mass-produced parts, the installation comprising:

a supporting structure with a supporting element;

a basket carrier for at least two centrifuge baskets; and a main drive device attached to the supporting structure and having a main drive and a longitudinal shaft, wherein the longitudinal shaft is mounted rotatably about a main axis with respect to the supporting element and is drivable rotatably about the main axis by the main drive, wherein the basket carrier is held suspended on the longitudinal shaft and is connected to the longitudinal shaft in a rotationally fixed manner, and a secondary drive device with at least one motor and, for each centrifuge basket, a drivetrain for rotating the centrifuge basket about a basket axis radially distanced from the main axis, wherein the at least one motor of the secondary drive device is arranged on the basket carrier, wherein the drivetrain respectively comprises a reduction gear with a gear housing which is fixed to the basket carrier, an input shaft which is rotatably drivable by the at least one motor, and an output element coaxial with the basket axis, wherein a transmission ratio between an input speed of the input shaft and an output speed of the output element is greater than one.

2. The installation according to claim 1, wherein the output element is rotatably supported in the gear housing by rolling bearings, and wherein an outer diameter of the output element of a respective reduction gear corresponds to 0.5 times to 1.0 times an outer diameter of the gear housing.

3. The installation according to claim 1, wherein the transmission ratio i of the respective reduction gear lies in a range from i=50 to i=200.

4. The installation according to claim 1, wherein the at least one motor has a nominal power of 5000 watts at most, wherein the at least two centrifuge baskets are drivable by the at least one motor in the same and in opposite rotary directions.

5. The installation according to claim 1, wherein the drivetrains each comprise a belt drive which is rotationally drivable by the at least one motor and which is drivingly connected to the input shaft of the respective reduction gear.

6. The installation according to claim 1, wherein the at least one motor has a rotor shaft which is rotatably drivable about a rotor axis, the rotor axis being arranged on an imaginary first circle, and the basket axes being arranged on an imaginary second circle, wherein the first circle and the second circle are arranged concentrically to the main axis, and a first radius of the first circle is smaller than a second radius of the second circle.

7. The installation according to claim 6, wherein the first radius is smaller than 0.5 times the second radius and wherein the first radius is smaller than 300 millimetres.

8. The installation according to claim 1, wherein the longitudinal shaft is designed as a hollow shaft through which a supply line for connecting the at least one motor to a supply system of the installation is passed from the supporting structure to the basket carrier.

9. The installation according to claim 8, wherein a central rotary lead-through for the supply line is arranged at an end of the longitudinal shaft facing away from the basket carrier, wherein the central rotary lead-through comprises a first body supported against the support structure and a second body connected in a rotationally fixed manner to the longitudinal shaft.

10. The installation according to claim 1, wherein the output element of the respective reduction gear has an output flange and a hollow cylindrical output shaft connected to the output flange, wherein the output shaft is fitted in the input shaft and is rotatably supported relative thereto about the respective basket axis.

11. The installation according to claim 1, wherein a flange-like rotary platform for releasably connecting the respective centrifuge basket is held suspended from the output element of the respective reduction gear, and is connected to the output element in a rotationally fixed manner.

12. The installation according to claim 11, wherein a connecting assembly for reversibly releasably connecting the respective centrifuge basket to the basket carrier is provided for each centrifuge basket, with first connectors of the connecting assembly being arranged on the rotary platforms, and second connectors of the connecting assemblies, which are connectable to the first connectors, being arranged on the centrifuge baskets.

13. The installation according to claim 12, wherein the first connectors are pneumatically actuable clamping modules, wherein at least one of pneumatic and electric lines for actuating the first connectors are passed from the supporting structure through the longitudinal shaft formed as hollow shaft to the basket carrier.

14. The installation according to claim 13, wherein the at least one of pneumatic and electric lines for actuating the first connectors are passed through the input shafts, formed as hollow shafts, of the reduction gears.

15. The installation according to claim 13, wherein a secondary rotary lead-through for the at least one pneumatic and electric lines for actuating the first connectors is arranged on the basket carrier for each rotary platform, with the secondary rotary lead-throughs each having a first body supported against a main body of the basket carrier and a second body connected to the rotary platform in a rotationally fixed manner.

* * * * *